Jan. 23, 1962  T. T. BROWN  3,018,394
ELECTROKINETIC TRANSDUCER
Filed July 3, 1957

INVENTOR
THOMAS TOWNSEND BROWN
BY
Watson, Cole, Grindle & Watson
ATTORNEYS

United States Patent Office

3,018,394
Patented Jan. 23, 1962

3,018,394
ELECTROKINETIC TRANSDUCER
Thomas Townsend Brown, Umatilla, Fla., assignor to Whitehall-Rand, Inc., Washington, D.C., a corporation of Delaware
Filed July 3, 1957, Ser. No. 669,831
11 Claims. (Cl. 310—5)

My invention relates to electrokinetic methods and apparatus and has particular reference to apparatus employed as an electrokinetic transducer.

The apparatus disclosed and described herein was contained in my application Serial No. 293,465, filed June 13, 1952, which application has become abandoned.

This invention utilizes heretofore unknown electrokinetic phenomenon which I have discovered, namely that when pairs of electrodes of appropriate form are held in a certain fixed spacial relationship to each other and immersed in a dielectric medium and then oppositely charged to an appropriate degree, a force is produced tending to move the surrounding dielectric with respect to the pair of electrodes. I have also discovered that if the dielectric medium is moved relative to the pairs of electrodes by an external mechanical force, a variation in the potential of the electrodes results which variation corresponds to the variations in the applied mechanical force.

Accordingly, it is an object of this invention to provide a method and apparatus for converting the energy of an electrical potential directly into a mechanical force suitable for causing relative motion between a structure and the surrounding medium.

It is another object of this invention to generate a varying electric potential by the motion of a surrounding dielectric medium with respect to a pair of electrodes supported in the medium.

Briefly in accordance with the aspects of this invention, pairs of electrodes are connected to each other in groups, each of the groups being connected in polarity opposition to the other groups. A source of high voltage is connected between each of the pairs of electrodes. The circuit may either be an input circuit or an output circuit depending on whether the transducer is to be used to convert mechanical energy to electrical energy or to convert electrical energy to mechanical energy. Advantageously, this circuit may include a transformer having a winding connected to each of the groups of electrodes and a high voltage source may be connected to one of each of the pairs of electrodes and a center tap of the transformer winding. Another winding of the transformer may be utilized as part of the input or output circuit depending on the particular use for the transducer as mentioned above.

It is a feature of this invention to employ pairs of electrodes connected together in opposing groups, a source of high voltage connected between each of the pairs of the electrodes and an associated electrical circuit for producing relative motion between the electrodes and the surrounding medium.

It is another feature of this invention to connect pairs of electrodes in groups certain of the pairs being arranged in polarity opposition with respect to certain other pairs of the electrodes, to connect a source of potential between each of the pairs of electrodes and to connect an electrical circuit to each of the pairs of electrodes.

It is another feature of this invention to provide an electrical transducer which includes pairs of electrodes connected in groups, certain of the groups being connected in polarity opposition with respect to certain other of the groups, a source of high voltage connected to each of the electrodes and an electrical circuit coupled to the electrodes for supplying varying electrical potentials to the electrodes.

It is another feature of this invention to connect pairs of electrodes to a source of high voltage, certain of the pairs being connected in polarity opposition with respect to certain other of the pairs, a high voltage source connected between each of the electrodes and an input circuit connected to each pair of electrodes to supply varying electrical potentials to the electrodes thus causing the electrodes to act as an electromechanical transducer.

It is a still further feature of this invention to convert mechanical energy to electrical energy by means of a transducer comprising pairs of electrodes connected in polarity opposition and spaced from each other to permit motion of the surrounding medium between the electrodes, to connect a source of high voltage to the electrodes and to connect an output circuit to each of the pairs of the electrodes which output circuit will receive a varying voltage in response to variations in the motion of the surrounding medium with respect to the electrodes.

Other objects and features of this invention will be apparent from a consideration of the following specification, read in connection with the accompanying drawings, wherein.

Figure 1:
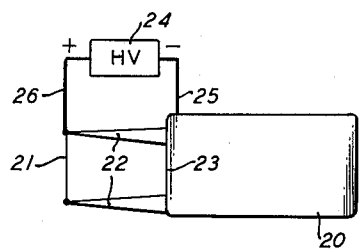
FIGURE 1 is a side elevational view illustrating diagrammatically a simple form of apparatus embodying certain of the principles of this invention.

Referring to the drawings, FIGURE 1 is a simple form of apparatus which is readily adaptable for use in demonstrating the principles of my invention, and which is utilized in this application as a simplfied representation to facilitate an understanding of the principles involved. The apparatus illustrated in FIGURE 1 comprises one electrode which is in the form of a body member 20, preferably comprising a relatively thin flat plate. A second electrode 21 in the form of a wire or other electrical conductor is held as by means of insulated supports 22 in fixed spacial relation to the body 20, the wire 21 being disposed in the plane of the body 20 and preferably substantially parallel with a leading edge 23 of the body 20. A source 24 of high voltage electrical potential is provided and connected as shown at 25 and 26 to the two electrodes 20 and 21, respectively.

I have discovered that when apparatus of the character just described is immersed in a dielectric medium as, for example, the ordinary air of the atmosphere, there is produced a force tending to move the entire assembly through the medium, and this force is applied in such direction as to tend to move the body 20 toward the leading electrode 21. This force produces relative motion between the apparatus and the surrounding fluid dielectric. Thus, if the apparatus is held in a fixed position, the dielectric medium is caused to move past the apparatus and to this extent the apparatus may be considered as analogous to a pump or fan. Conversely, if the apparatus is free to move, the relative motion between the medium and the apparatus results in a forward motion of the apparatus, and it is thus seen that the apparatus is a self-propulsive device.

Figure 2:
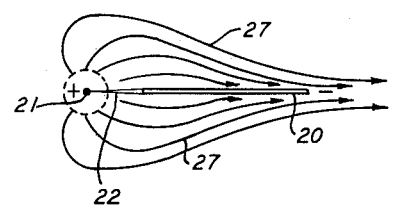
FIGURE 2 is a plan view of the apparatus shown in FIGURE 1.

While the phenomenon just described has been observed and its existence confirmed by repeated experiment, the principles involved are not completely understood. It has been determined that the greatest forces are developed when the leading electrode is made positive with respect to the body 20, and it is accordingly thought that in the immediate vicinity of the electrode 21 where the potential gradient is very high, free electrons are stripped off of the atoms and molecules of the surrounding medium. These electrons migrate to the positive electrode 21 where they are collected. This removal of free electrons leaves the respective atoms and molecules positively charged and such charged atoms and molecules are accordingly repelled from the positive electrode 21 and attracted toward the negative electrode 20. The paths of movement of these positively charged particles appear to be of the nature represented by the lines 27 in FIGURE 2.

It appears that upon reaching or closely approaching the surface of the body 20, the positively charged atoms and molecules have their positive charges neutralized by the capture of electrons from the body 20 and in many cases, it may be that excess electrons are captured whereby to give such atoms and molecules a negative charge so that they are actually repelled from the body 20.

It will be appreciated that the mass of each of the individual electrons is approximately one two-thousandths the mass of the hydrogen atom and is accordingly negligible as compared with the mass of the atoms and molecules of the medium from which they are taken. The principal forces involved therefore are the forces involved in moving the charged atoms and molecules from the region of the positive electrode 21 to and beyond the negatively charged body 20. The force so exerted by the system on those atoms and molecules not only produces a flow of the medium relative to the apparatus, but, of course, results in a like force on the system tending to move the entire system in the opposite direction; that is, to the left as viewed in FIGURE 1 of the drawing.

Actual results have indicated that the wire electrode 21 may be of small diameter for low voltages, i.e. voltages below 125 kv. but for voltages above this value, larger hollow pipe or rod-shaped electrodes should be employed.

Figure 3:
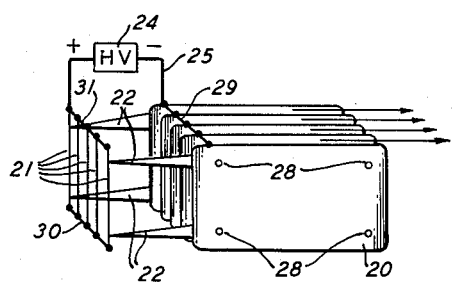
FIGURE 3 is a perspective view illustrating the manner in which a plurality of devices of the character illustrated in FIGURE 1 may be interconnected for joint operation.

In FIGURE 3, there is illustrated the manner in which a plurality of assemblies, such as are shown in FIGURE 1, may be interconnected for joint operation. As may be seen from FIGURE 3, a plurality of such assemblies are placed in spaced side-by-side relation. They may be held fixed in such spaced relation through the use of a plurality of tie rods 28 and interposed spaces (not shown) placed between adjacent plates 20. The assembly of plates 20 may be electrically interconnected by a bus bar or similar conductor 29 to which the negative lead 25 is connected. In a similar way, the plurality of positive leading electrodes 21 may be held in appropriately spaced relation to each other by fastening their ends to pairs of bus bars 30 and 31, to the latter of which the positive lead 26 is connected. The assembly of leading electrodes 21 may be held in spaced relation to the assembly of body members 20 by an appropriate arrangement of the supports 22.

Figure 4:
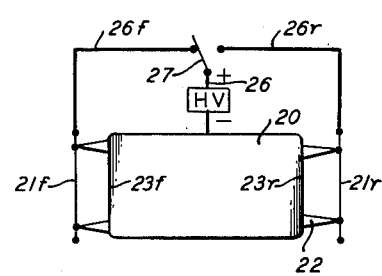
FIGURE 4 is a diagrammatic view similar to FIGURE 1 illustrating a modified form of the invention providing a means for reversing the direction of the propulsive force produced.

In FIGURE 4 is illustrated diagrammatically an arrangement of parts for producing a reversible action; that is, permitting the direction of the propulsive force to be reversed. The apparatus is similar to that shown in FIGURE 1, differing therefrom in utilizing a pair of leading electrodes 21$f$ and 21$r$ spaced by means of spacers 22 from the front and rear edges 23$f$ and 23$r$ of the body member 20 in a manner similar to that described with reference to the supports 22 in FIGURE 1. The source 24 of high voltage electrical potential has its negative terminal connected to the body 20 as by means of the aforementioned conductor 25. The positive terminal is connected as by means of the conductor 26 to the blade 27 of a single-pole, double-throw switch, serving in one position to connect the conductor 26 to a conductor 26$f$ which is in turn connected to the forward electrode 21$f$ and arranged in its opposite position to connect the conductor 26 to a conductor 26$r$ which is in turn connected to the reverse electrode 21$r$.

It will be seen that with the switch 27 in the position shown in FIGURE 4, the apparatus will operate in the manner described in connection with FIGURE 1, causing the assembly to move to the left as viewed in FIGURE 4. By throwing the switch 27 to the opposite position, the direction of the forces produced are reversed and the device moves to the right as viewed in FIGURE 4.

In accordance with the aspects of this invention these forces may be utilized in at least two ways, a varying potential may be super-imposed on the high voltage supplied to the electrodes and this varying potential will cause the electrodes to move with respect to the surrounding medium in accordance with the varying potential. Alternatively, the surrounding medium may be mechanically moved with respect to the electrodes which movement causes corresponding variations in the electrical charge on the electrodes by kinetic energy of the means of the medium. The moving medium apparently scrubs charged particles from the surface of the electrodes in a manner similar to that of the fluid stream-electrode operation in the high voltage generator disclosed and described in detail in my application Serial No. 669,727, filed July 3, 1957.

Figure 5:
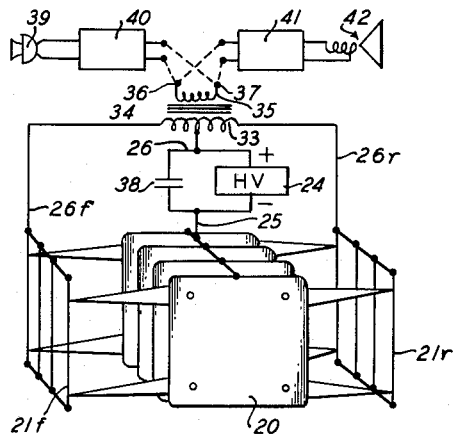
FIGURE 5 is a digrammatic view illustrating the manner of utilizing the apparatus described as a transducer for interconverting electrical energy and mechanical energy.

In FIGURE 5 is illustrated the principles of the invention embodied in a transducer for interconverting sound or pressure wave signals and electrical signals. The apparatus shown in FIGURE 5 preferably constitutes a multiple assembly of the character shown in FIGURE 3, utilizing individual units of the reversible type shown in FIGURE 4. In place of the switch 27 shown in FIGURE 4, I utilize the center-tapped primary winding 33 of a coupling transformer 34, the center tap of the winding being connected to the conductor 26 and the end terminals of the winding being connected, respectively, to the conductors 26$f$ and 26$r$. A secondary winding 35 of the transformer 34 is connected to terminals 36 and 37 to which the input signal may be applied, or from which the opposite signal may be taken. The high voltage supply 24 is preferably shunted by a bypass condenser 38, serving to provide a low impedance path for audio frequency signals. If the device is to be used as a loud speaker or producer of pressure wave variations, an electrical signal corresponding to the desired pressure variations is applied to the terminals 36 and 37, as for example signals derived from a microphone 39 after suitable amplification in an amplifier 40, the output of the amplifier 40 being connected as indicated by the dotted line shown in FIGURE 5 to the terminals 36 and 37.

With no signal applied to the input transformer, the high voltage which is applied to the electrodes 21$f$ is exactly equal to the high voltage applied to the electrodes 21$r$ with the result that there is no movement of the dielectric medium. However, when a signal is applied to the input transformer, the voltage applied through the electrodes 21$f$ and 21$r$ are caused to vary in accordance therewith and oppositely with respect to each other so that there results a net movement of the surrounding medium in accordance with the frequency and magnitude of the applied signal. The device thus operates as a loud speaker or like transducer.

When the device is used as a microphone or other pressure wave sensing device, the varying potentials which are superimposed upon the applied high voltage by the movement of the medium with respect to the structure appears on the output terminals 36 and 37. The output signals appearing on the terminals 36 and 37 may be converted into audible signals by connecting the input of an amplifier 41 to those terminals as indicated by the dotted line showing in FIGURE 5, and by connecting the output of the amplifier 41 to a loud speaker 42 or other sound-producing device.

In accordance with the foregoing explanation, it is apparent that the apparatus herein disclosed and described represents a unique arrangement for the inter-conversion of electrical and mechanical energy. With this simplified apparatus, it is possible to convert electrical energy to mechanical energy in the form of sound or other mechanical vibrations by the use of pairs of electrodes rigidly connected to each other by insulating supports, certain of the pairs of electrodes being connected in polarity opposition with respect to certain other of the pairs of electrodes. Further, this structure is adapted to produce electrical signals in response to the mechanical motion of the medium surrounding the electrodes and these signals will be representative of the variations in the mechanical energy so applied. This apparatus may also be connected in suitable electrical circuitry in such a manner that the apparatus will act both as a transducer from electrical to mechanical energy and as a transducer from mechanical energy to electrical energy.

While I have shown and described various embodiments of my invention, it is appreciated that the principles thereof may be extended to many and varied types of machines and apparatus. The invention therefore is not to be limited to the details illustrated and described herein.

I claim:

1. An electromechanical transducer comprising a plurality of electrodes connected in first and second groups, said groups being secured together, a source of direct current potential having one terminal connected to said first group and another terminal connected to said second group and alternating current means connected to said first and said second groups, one of said groups comprising electrodes of substantially greater surface area than the other of said groups.

2. A transducing device for producing relative motion between the device and the surrounding medium comprising pairs of electrodes mechanically connected together by insulating supports, one electrode of each of said pairs being connected in one group, the other electrode of each of said pairs being connected in another group, direct current means connected to said groups and means for applying a different electrical signal to each of said groups, one of said groups of electrodes comprising substantially flat members having a greater surface area than the electrodes of the other of said groups.

3. An electromechanical transducer comprising pairs of electrodes connected together in opposing groups, a source of high direct current voltage connected between each of said groups and an alternating current electrical circuit coupled to said electrodes whereby said transducer is adapted to produce relative motion between the electrodes and the surrounding medium, one of said groups of electrodes comprising substantially flat members having a larger electrode area than the electrodes of the other of said groups.

4. An electromechanical transducer comprising electrodes connected in groups, a source of potential connected between each of said groups of electrodes certain of said groups being arranged in polarity opposition with respect to certain other of said groups and an alternating current electrical circuit coupled to said groups of electrodes, one of said groups of electrodes comprising substantially flat members having a larger surface area than the electrodes of the other of said groups.

5. An electromechanical transducer comprising pairs of electrodes connected in groups, a source of electrical potential connected to each of said electrodes certain of said groups being connected in polarity opposition with respect to certain other of said groups, and means including an alternating current electrical circuit coupled to said electrodes for supplying varying electrical potentials to said electrodes, the electrodes of one of said groups having a greater surface area than the electrodes of the other of said groups, one of the electrodes of each of said groups being in a common plane.

6. A circuit for converting mechanical energy into electrical energy comprising a plurality of electrodes connected in groups, a high voltage source connected between each of said groups of electrodes, certain of said groups being connected in polarity opposition with respect to certain other of said groups and an alternating current electrical circuit connected to each group of electrodes, the electrodes of one of said groups having a greater surface area than the electrodes of the other of said groups.

7. A circuit for inter-converting electrical and mechanical energy comprising a plurality of electrodes mechanically secured to each other by insulating members, certain of said electrodes being secured in polarity opposition with respect to certain other of said electrodes, a high direct current voltage source connected between said electrodes and means including an alternating current electrical circuit coupled to said electrodes for receiving and delivering electrical energy with respect to said electrodes, certain of said electrodes having a larger surface area than certain other of said electrodes.

8. A circuit for inter-converting electrical and mechanical energy comprising a plurality of electrodes mechanically secured together by means of insulating supports, certain of said electrodes being connected in polarity opposition with respect to certain other of said electrodes, a high direct current voltage source connected to each of said electrodes and an input circuit connected to said electrodes for supplying varying electrical potentials to said electrodes thereby causing said electrodes to act as an electromechanical transducer, certain of said electrodes being defined by relatively flat members having a larger surface area than the other of said electrodes.

9. Apparatus for producing relative motion between a transducer and the surrounding medium comprising a plurality of electrodes insulatably connected to each other, certain of said pairs being connected in polarity opposition with respect to certain other of said pairs, a source of high direct current voltage connected to each of said electrodes and means including an electrical circuit connected to each of said pairs to receive and deliver electrical energy relative to said electrodes, one electrode of each of said pairs being defined by a relatively large surface area with respect to the other electrode of said pair.

10. An electromechanical transducer comprising a plurality of substantially flat electrodes, a plurality of electrodes having a smaller surface area than said first-mentioned plurality of electrodes supported in fixed spaced relationship with respect to the edges of said flat electrodes and substantially in the plane thereof, power means connected to each of said electrodes to impress high direct current voltage thereon and alternating current circuit means coupled to said electrodes.

11. An electromechanical transducer comprising a plurality of substantially flat electrodes, a plurality of electrodes supported in fixed spaced relationship with respect to the edges of said flat electrodes and substantially in the plane thereof, said last-mentioned plurality of electrodes having a smaller surface area than said substantially flat electrodes, power means connected across said electrodes to impress high direct current voltage thereon, and alternating current detector means coupled to said electrodes to detect variations in the electrical voltage thereof caused by movement of the ionizable dielectric medium surrounding said electrodes.

References Cited in the file of this patent

UNITED STATES PATENTS

| | | |
|---|---|---|
| 1,974,483 | Brown | Sept. 25, 1934 |
| 2,231,877 | Bennett | Feb. 18, 1941 |
| 2,279,586 | Bennett | Apr. 14, 1942 |
| 2,305,500 | Slayter | Dec. 15, 1942 |